(12) United States Patent
Sasaki

(10) Patent No.: US 7,433,138 B2
(45) Date of Patent: Oct. 7, 2008

(54) ACTUATOR

(75) Inventor: Ryota Sasaki, Saitama (JP)

(73) Assignee: FUJINON Corporation, Saitama (JP)

( * ) Notice: Subject to any disclaimer, the term of this patent is extended or adjusted under 35 U.S.C. 154(b) by 0 days.

(21) Appl. No.: 11/501,852

(22) Filed: Aug. 10, 2006

(65) Prior Publication Data

US 2007/0035859 A1 Feb. 15, 2007

(30) Foreign Application Priority Data

Aug. 12, 2005 (JP) ............................ P2005-234640

(51) Int. Cl.
*G02B 7/02* (2006.01)
(52) U.S. Cl. ..................................... 359/824; 359/819
(58) Field of Classification Search ................. 359/824, 359/694, 699, 700, 819, 822; 310/369, 317, 310/328
See application file for complete search history.

(56) References Cited

U.S. PATENT DOCUMENTS 6,528,926 B2    3/2003  Okamoto et al.

2002/0084719 A1   7/2002  Okamoto et al.
2004/0007941 A1   1/2004  Yuasa et al.
2005/0242688 A1*  11/2005 YUasa et al. ............... 310/328

FOREIGN PATENT DOCUMENTS

| EP | 0464764 A1 | 1/1992 |
| JP | 06-123830 A | 5/1994 |
| JP | 2633066 B2 | 4/1997 |
| JP | 2000-348358 A | 12/2000 |
| JP | 2002-142470 | 5/2002 |

* cited by examiner

*Primary Examiner*—Timothy J Thompson
(74) *Attorney, Agent, or Firm*—Birch, Stewart, Kolasch & Birch, LLP

(57) ABSTRACT

An actuator comprises: an electro-mechanical conversion element; a driving frictional member mounted onto one side in an extension/contraction direction of the electro-mechanical conversion element; a driven member frictionally engaged with the driving frictional member; and a weight member that comprises an adhesive agent and is attached to the other side in the extension/contraction direction of the electro-mechanical conversion element.

3 Claims, 5 Drawing Sheets

ACTUATOR

BACKGROUND OF THE INVENTION

1. Field of the Invention

The present invention relates to an actuator, and particularly relates to an actuator that is installed in a digital camera, mobile phone, or other compact precision apparatus and drives a zoom lens.

2. Description of the Related Art

As a driving device for a lens unit of a digital camera, etc., an actuator that employs a piezoelectric element is used. For example, with an actuator of Japanese Patent No. 2633066, a driving shaft is affixed to one side of a piezoelectric element, and the other side of the piezoelectric element is fixed to a main device body. A lens barrel is slidably supported on the driving shaft, and the lens barrel is frictionally engaged with the driving shaft by making use of an urging force of a plate spring. Drive pulses of substantially sawtooth-like waveform are applied to the piezoelectric element, and the piezoelectric element deforms at different speeds in an extension direction and a contraction direction. For example, when the piezoelectric element gradually deforms, the lens barrel moves along with the driving shaft. Oppositely, when the piezoelectric element rapidly deforms, the lens barrel stays at the same position due to its mass inertia. Thus, by repeatedly applying drive pulses of substantially sawtooth-like waveform to the piezoelectric element, the lens barrel can be moved intermittently at a fine pitch.

However, with the actuator of Japanese Patent No. 2633066, the piezoelectric element frequently undergoes resonant vibration, and because, the piezoelectric element or the driving shaft undergoes lateral vibration or torsion in directions that differ from the displacement direction due to this resonant vibration, a driven member does not accurately move in the displacement direction. The actuator of Japanese Patent No. 2633066 is thus unstable in driving amount with respect to driving frequency.

As a method for solving the above issue, a method for displaceably supporting the other side of the piezoelectric element by attaching a weight member to the other side of the piezoelectric element can be considered.

However, with the method for attaching a weight member to the other side of the piezoelectric element, the adhesion of the piezoelectric element and the weight member tends to become readily removed due to vibration of the piezoelectric element, and a separate weight member must be prepared.

SUMMARY OF THE INVENTION

The present invention has been made in view of these circumstances, and an object thereof is to provide an actuator, with which the number of parts can be reduced and yet with which a weight member can be reliably attached to the piezoelectric element.

To achieve the above object, according to a first aspect of the invention, there is provided an actuator comprising: an electro-mechanical conversion element; a driving frictional member mounted onto one side in an extension/contraction direction of the electro-mechanical conversion element; a driven member frictionally engaged with the driving frictional member; and a weight member that comprises an adhesive agent and is attached to the other side in the extension/contraction direction of the electro-mechanical conversion element.

With the first aspect of the invention, because the weight member that is attached to the other side in the extension/contraction direction of the electro-mechanical conversion element is formed of an adhesive agent, the number of parts can be reduced in comparison to a case of fixing a weight member by means of an adhesive agent. Also, because the weight member that is formed of the adhesive agent can be freely shaped during manufacture, a weight member of a shape in accordance with the available space can be used. Here, "adhesive agent" refers to a substance having a property of affixing two objects upon being interposed between the two objects, and especially to a substance with a property of having fluidity during an adhesion process and solidifying thereafter.

A second aspect of the invention provides the actuator according to the first aspect of the invention, wherein a metal powder is kneaded into the adhesive agent. With the second aspect of the invention, because the metal powder is kneaded into the metal powder, the specific gravity of the weight member can be made large. The moving distance, moving speed, and thrust of the driven member can thereby be improved.

A third aspect of the invention provides the actuator according to the first or second aspect of the invention, further comprising an elastic supporting member that displaceably supports the other side of the electro-mechanical conversion element, wherein the weight member fixes, by adhesion, the other side of the electro-mechanical conversion element to the elastic supporting member. With the third aspect of the invention, a mounting bracket and the electro-mechanical conversion element can be adhered together by means of the weight member that is formed of the adhesive agent.

A fourth aspect of the invention provides the actuator according to any of the first to third aspects of the invention, wherein a holding frame of a zoom lens is mounted onto the driven member.

DETAILED DESCRIPTION OF THE INVENTION

Preferred embodiments of an actuator according to the present invention shall now be described in detail with reference to the attached drawings.

Figure 1:
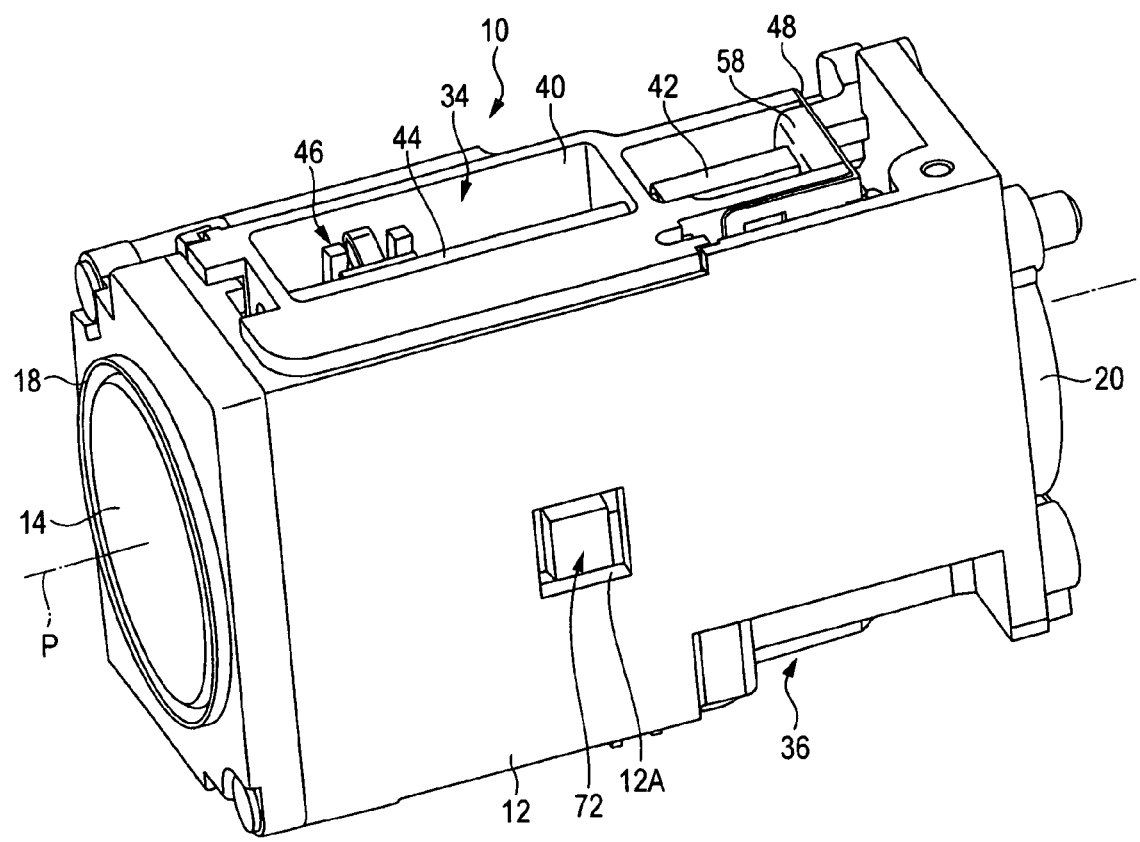
FIG. 1 is a perspective view of a lens device to which an actuator according to the present invention is applied.
Figure 2:
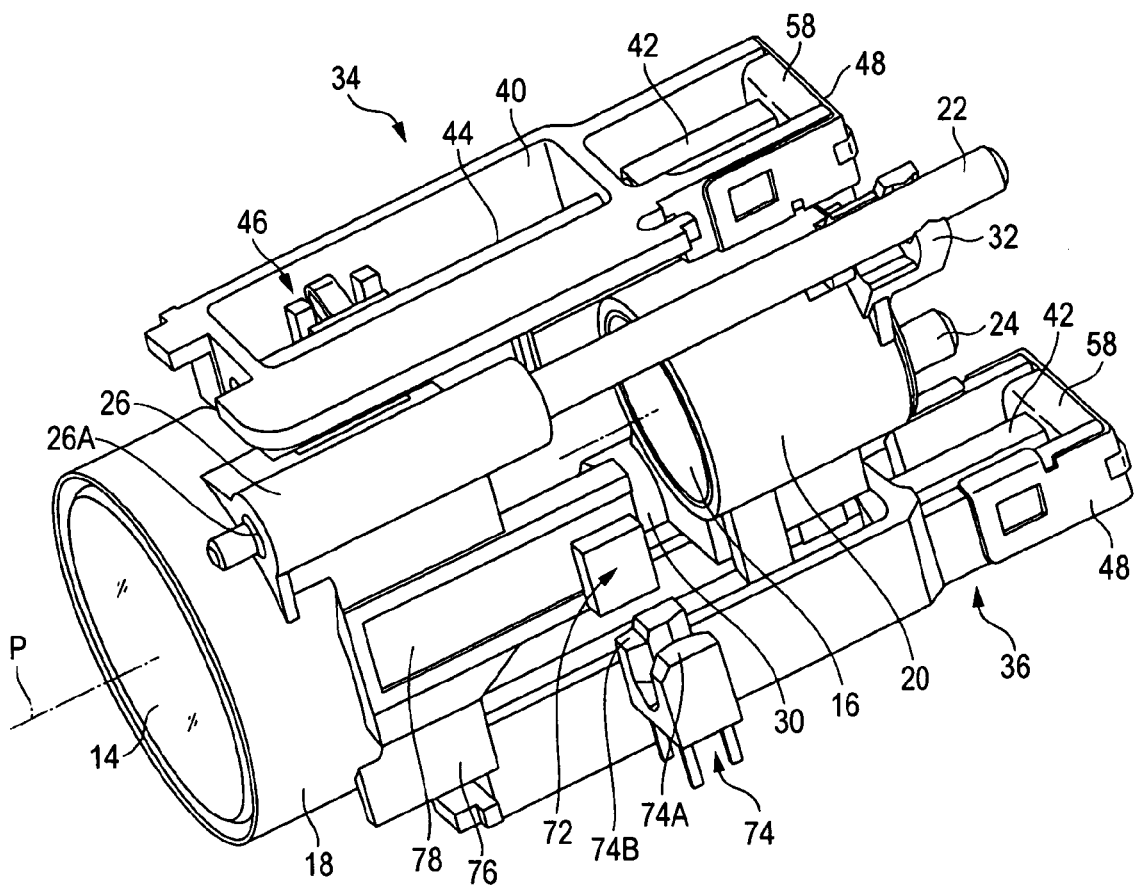
FIG. 2 is a perspective view of an internal arrangement of the lens device of FIG. 1.
Figure 3:
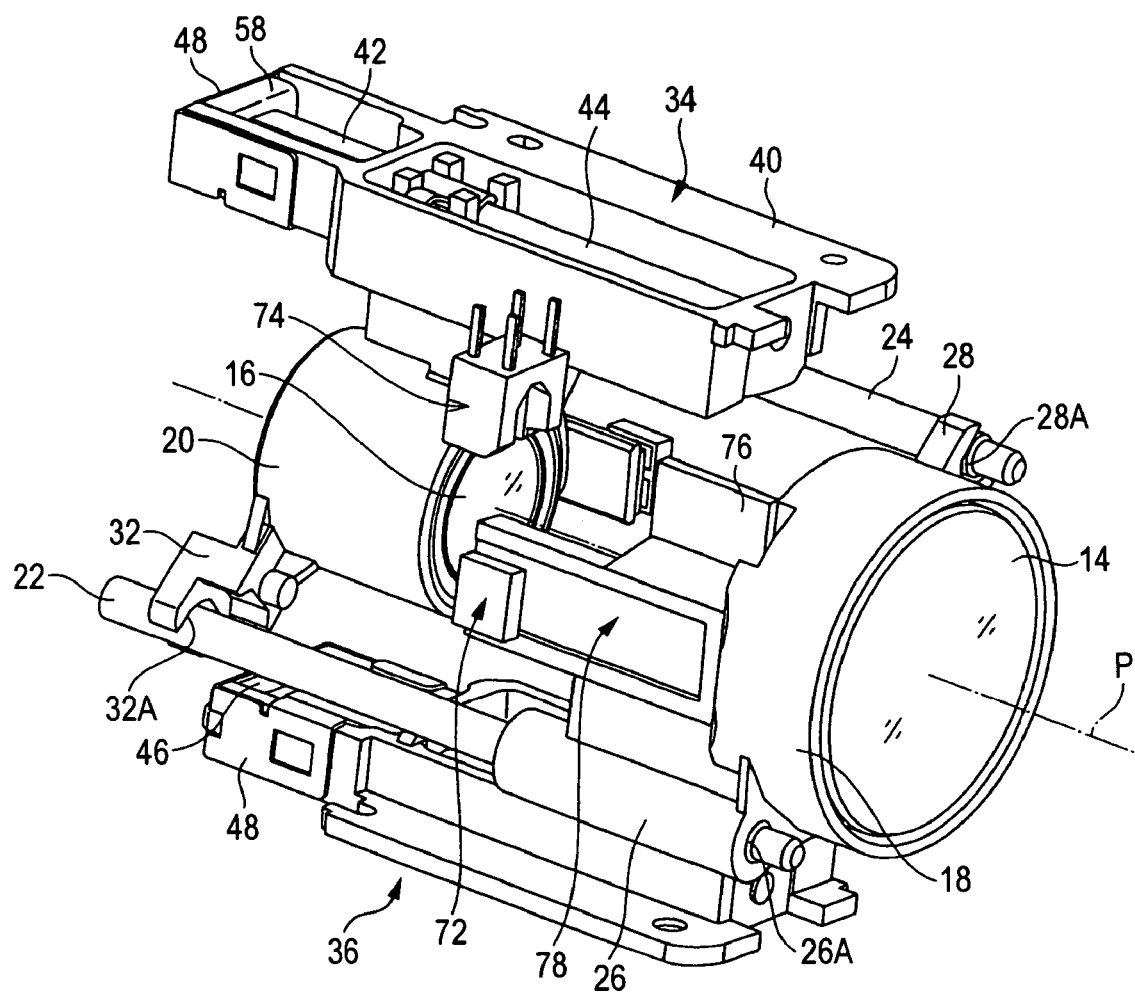
FIG. 3 is a perspective view of the lens device as viewed from a different direction as FIG. 2.

FIG. 1 is a perspective view of a lens device 10 to which an actuator according to the present invention is applied, and FIGS. 2 and 3 are perspective views of an internal arrangement of this device.

As shown in FIG. 1, the lens device 10 has a main body 12, formed to a substantially rectangular shape, and has zoom lenses (groups) 14 and 16 in the interior of the main body 12 as shown in FIGS. 2 and 3. Of the zoom lenses (groups) 14 and 16, one is a variator lens and the other is a compensator lens. The zoom lenses (groups) 14 and 16 are respectively held in holding frames 18 and 20, and these holding frames 18 and 20 are supported by two guide shafts 22 and 24 in a manner enabling sliding along an optical axis P direction. The two guide shafts 22 and 24 are disposed in parallel to the optical axis P at diagonal positions inside the main body 12 and are fixed to the main body 12.

The holding frame 18 has a guide portion 26, having an insertion hole 26A through which the guide shaft 22 is inserted, and an engaging portion 28, having a U-shaped groove 28A that is engaged with the guide shaft 24. The holding frame 18 is thereby guided by the two guide shafts 22 and 24, and the zoom lens (group) 14 is supported in a manner enabling movement along the optical axis P direction. Likewise, the holding frame 20 of the zoom lens 16 has a guide portion 30, having an insertion hole (not shown) through which the guide shaft 24 is inserted, and an engaging portion 32, having a U-shaped groove 32A, with which the guide shaft 22 is engaged. The holding frame 20-is thereby guided by the two guide shafts 22 and 24, and the zoom lens (group) 16 is supported in a manner enabling movement along the optical axis P direction.

The zoom lenses (groups) 14 and 16 are driven along the optical axis P direction by means of actuators 34 and 36, respectively. The actuators 34 and 36 are disposed at opposing faces of the main body 12. Specifically, the actuator 34 for the zoom lens (group) 14 is disposed on an upper face of the main body 12 in FIG. 1, and the actuator 36 for the zoom lens (group) 16 is disposed on a lower face of the main body 12. Though a description of the actuator 34 shall be provided below, the actuator 36 is arranged in the same manner.

Symbols 72 and 74 in FIGS. 1 to 3 indicate position detectors that detect positions of the holding frame 18 and the holding frame 20. The position detector 72 is a reflection type photointerrupter that is disposed opposite a plate-like reflecting portion 78, formed integral to the holding frame 18 (or the holding frame 20), and is fitted and fixed in an opening 12A of the main body 12 (see FIG. 1). On the reflecting portion 78, a plurality of reflecting bodies (not shown) are disposed at fixed intervals along the driving direction. Light is thus projected from the position detector 72 to the reflecting portion 78, and by receiving the reflected light and detecting the variation of the light amount, the movement amount of the reflecting portion 78 (that is, the holding frame 18 or 20) can be detected. Meanwhile, the position detector 74 has a light projecting portion 74A and a light receiving portion 74B, and a plate-like light blocking portion 76 that is formed integral to the holding frame 18 (or the holding frame 20) is inserted into and drawn out from in between the light projecting portion 74A and the light receiving portion 74B. Thus by the light blocking portion 76 being inserted between the light projecting portion 74A and the light receiving portion 74B and the light amount detected by the light receiving portion 74B varying accordingly, that the light blocking portion 76 (that is, the holding frame 18 or 20) has moved to a predetermined position can be detected. By thus detecting reference positions of the holding frames 18 and 20 by means of the position detector 74 and detecting the moving amounts of the holding frames 18 and 20 by means of the position detector 72, the positions of the holding frames 18 and 20 can be accurately determined. The actuators 34 and 36 are driven and controlled based on measurement values of the position detectors 72 and 74.

Figure 4:
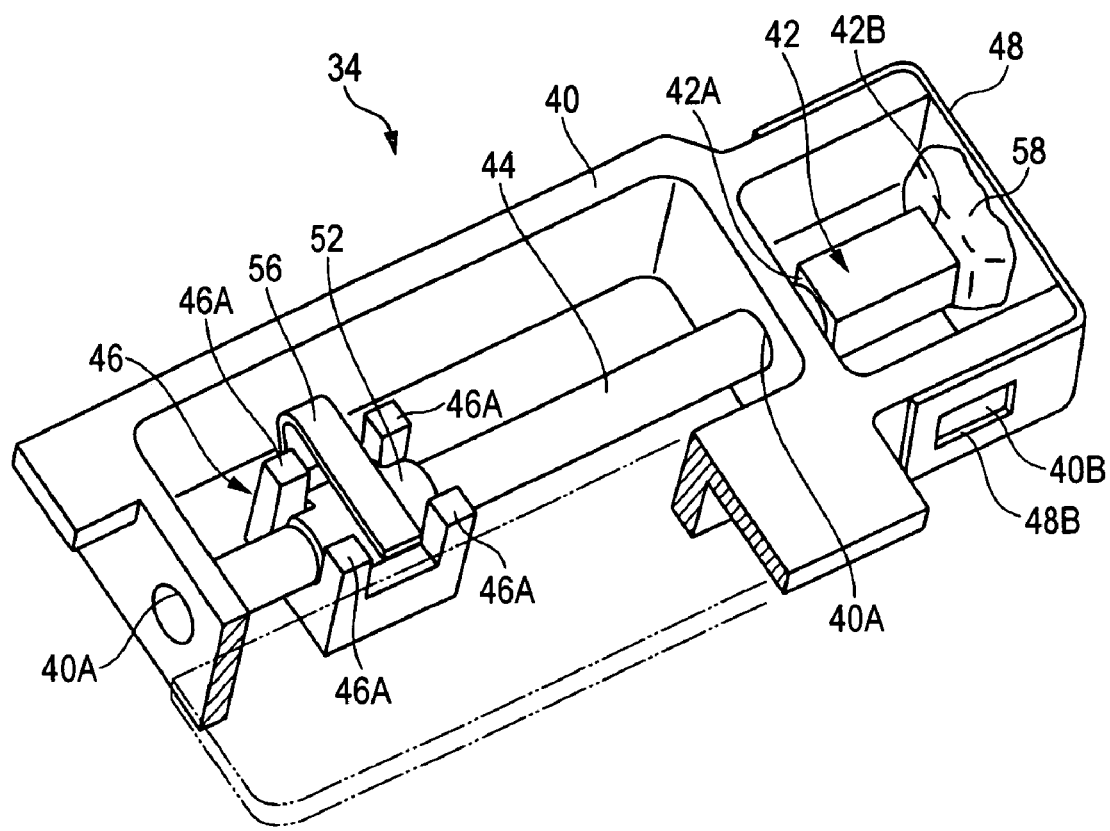
FIG. 4 is a schematic diagram of an arrangement of the actuator of the first embodiment.

FIG. 4 is a perspective view of an arrangement of the actuator 34. As shown in this figure, the actuator 34 is mainly arranged from a fixed frame 40, a piezoelectric element (corresponding to being an electro-mechanical conversion element) 42, a driving shaft (corresponding to being a driving frictional member) 44, a connecting block (corresponding to being a driven member) 46, a mounting bracket (corresponding to being an elastic supporting member) 48, and a weight member 58, and the fixed frame 40 is fixed to the main body 12 of the lens device 10 of FIG. 1.

The piezoelectric element 42 is layered along the optical axis P direction (hereinafter, "driving direction") of the lens device 10 and is arranged to deform (extend or contract) along the driving direction upon application of voltage. Thus, with the piezoelectric element 42, end faces 42A and 42B in the longitudinal direction become displaced along the driving direction upon application of voltage.

Of the end faces 42A and 42B of the piezoelectric element 42, a base end of the driving shaft 44 is affixed to one end face 42A. The driving shaft 44 is formed to a cylindrical shape and is positioned so that its central axis lies along the driving direction. The driving shaft 44 is inserted through two holes 40A formed in the fixed frame 40 and is thereby guided and supported in a manner enabling sliding along the central axis direction. As the material of the driving shaft 44, a graphite crystal composite, such as carbon graphite, in which graphite crystals are firmly compounded, is used.

A connecting block 46 is engaged with the driving shaft 44. The connecting block 46 is connected to the above-described holding frame 18 of the zoom lens 14 and is supported in a manner enabling sliding along the optical axis P direction (the driving direction) along with the holding frame 18. The connecting block 46 is formed to a rectangular shape, and upwardly protruding protrusions 46A are respectively provided on the four corners thereof.

Figure 5:
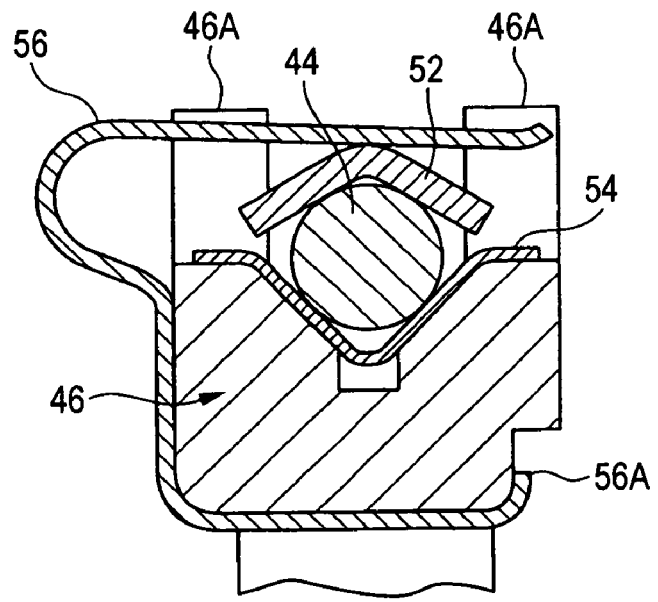
FIG. 5 is a sectional view of a connection portion of a driving shaft and a connecting block.

FIG. 5 is a sectional view of the connection portion of the connecting block 46 and the driving shaft 44. As shown in this FIGURE, a first sliding member 52 and a second sliding member 54 are provided at the connection portion of the connecting block 46 and the driving shaft 44. The first sliding member 52 is disposed at an upper side of the driving shaft 44, and the second sliding member 54 is disposed at a lower side of the driving shaft 44. The first sliding member 52 and the second sliding member 54 are members that are provided to obtain a stable frictional force between the connecting block 46 and the driving shaft 44, and are formed, for example, from stainless steel.

The second sliding member 54 is formed to a V-shape and is fixed to the connecting block 46. Meanwhile, the first sliding member 52 is formed to an inverted V-shape and is positioned in a region surrounded by the four protrusions 46A of the connecting block 46. The first sliding member 52 is notched at its respective corner portions in accordance with the protrusions 46A of the connecting block 46. Thus when the first sliding member 52 is positioned in the region surrounded by the protrusions 46A, the first sliding member 52 is prevented from falling off from the connecting block 46.

A pressing spring 56 is mounted onto the connecting block 46. The pressing spring 56 is arranged by bending a metal plate and is mounted onto the connecting block 46 by hitching a pawl 56A onto a lower portion of the connecting block 46. The pressing spring 56 also has a pressing portion 56B that is positioned on an upper side of the first sliding member 52 and is arranged to urge the first sliding member 52 downward by the pressing portion 56B. The driving shaft 44 is thereby put in a state of being sandwichingly pressed by the first sliding member 52 and the second sliding member 54, and the connecting block 46 is frictionally engaged with the driving shaft 44 via the first sliding member 52 and the second sliding member 54. The frictional force between the connecting block 46 and the driving shaft 44 is set so that when drive pulses of a gradual voltage variation are applied to the piezoelectric element 42, the frictional force is greater than the driving force, and when drive pulses of a rapid voltage variation are applied to the piezoelectric element 42, the frictional force is less than the driving force. Here, the frictional force (sliding resistance) is preferably no less than 10 gf and no more than 30 gf and more preferably no less than 15 gf and no more than 25 gf.

As shown in FIG. 4, the weight member 58 is attached to the end face 42B of the piezoelectric element 42. The weight member 58 is made large in specific gravity by kneading a powder of tungsten or other metal in a silicone-based or UV-curing adhesive agent, and is filled between the end face 42B of the piezoelectric element 42 and the mounting bracket 48. This weight member 58 serves not only the role of an adhesive agent that adheres the piezoelectric element 42 to the mounting bracket 48 but also acts as a weight that applies a load to the end face 42B. That is, the weight member 58 has a role of a weight that prevents the end face 42B from becoming displaced more than the end face 42A. Thus, as the weight member 58, a member that is greater in weight than the driving shaft 44 is preferable. To achieve compact size, the specific gravity of the weight member 58 is preferably made as high as possible and is set, for example, to approximately 8 to 12. Also preferably, the weight member 58, when hardened, has a Young's modulus less than that of each of the piezoelectric element 42 and the driving shaft 44 and, for example, is arranged to have a Young's modulus of no more than 300 MPa. The weight member 58 may be formed to a shape in accordance with the available space.

The mounting bracket 48 is formed by bending a thin metal plate to a square C-shape and openings 48B are formed at the bent portions at both ends. The mounting bracket 48 is mounted onto the fixed frame 40 by fitting the openings 48B into protrusions 40B of the fixed frame 40. The piezoelectric element 42 is thus supported on the fixed frame 40 via the weight member 58 and the mounting bracket 48.

The piezoelectric element 42 that is supported as described above is supported in a manner in which the end face 42B can be displaced along the driving direction. That is, the rear end face 42B of the piezoelectric element 42 can be displaced along the driving direction by the warping of the mounting bracket 48.

Figure 6A:
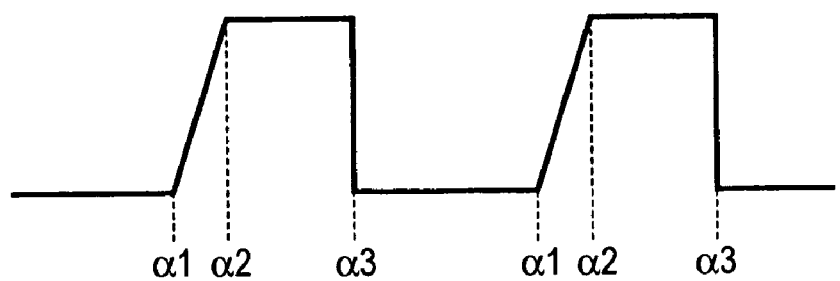
FIGS. 6A and 6B show diagrams of examples of voltage drive pulses that are applied to a piezoelectric element.
Figure 6B:
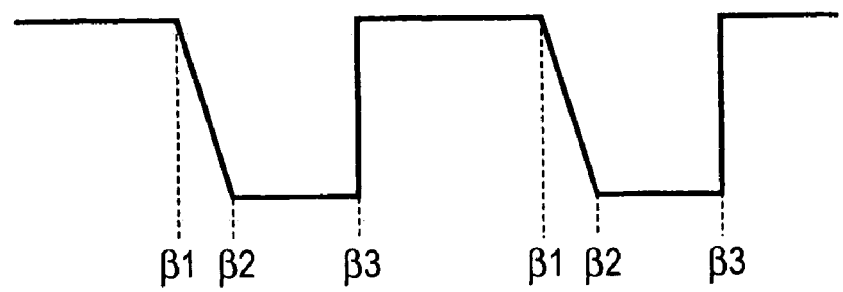

The voltages of the drive pulses shown in FIGS. 6A and 6B are applied to the piezoelectric element 42. FIG. 6A shows the drive pulses for moving the connecting block 46 of FIG. 4 in the left direction, and FIG. 6B shows the drive pulses for moving the connecting block 46 of FIG. 4 in the right direction.

In the case of FIG. 6A, substantially sawtooth-like drive pulses, each of which gradually rises from a time $\alpha1$ to a time $\alpha2$ and rapidly drops at a time $\alpha3$, are applied to the piezoelectric element 42. Thus from the time $\alpha1$ to the time $\alpha2$, the piezoelectric element 42 gradually extends. Because in this process, the driving shaft 44 moves at a gradual speed, the connecting block 46 moves along with the driving shaft 44. The connecting block 46 of FIG. 4 can thereby be moved in the left direction. At the time $\alpha3$, because the piezoelectric element 42 rapidly contracts, the driving shaft 44 moves in the right direction. Because in this process, the driving shaft 44 rapidly moves, the connecting block 46 remains stopped at the same position due to inertia and just the driving shaft 44 moves. Thus by repeatedly applying the sawtooth-like drive pulses shown in FIG. 6A, the connecting block 46 of FIG. 4 is made to repeat movement in the left direction and stoppage, and can thus be moved in the left direction.

In the case of FIG. 6B, substantially sawtooth-like drive pulses, each of which gradually drops from a time $\beta1$ to a time $\beta2$ and rapidly rises at a time $\beta3$, are applied to the piezoelectric element 42. Thus from the time $\beta1$ to the time $\beta2$, the piezoelectric element 42 gradually contracts. Because in this process, the driving shaft 44 is displaced at a gradual speed, the connecting block 46 moves along with the driving shaft 44. The connecting block 46 of FIG. 4 can thereby be moved in the right direction. At the time $\beta3$, because the piezoelectric element 42 rapidly extends, the driving shaft 44 moves in the left direction. Because in this process, the driving shaft 44 rapidly moves, the connecting block 46 remains stopped at the same position due to inertia and just the driving shaft 44 moves. Thus by repeatedly applying the sawtooth-like drive pulses shown in FIG. 6B, the connecting block 46 of FIG. 4 is made to repeat movement in the right direction and stoppage, and can thus be moved in the right direction.

The actions of the actuator 34 arranged as described above shall now be described.

As described above, with the actuator 34, the weight member 58 is formed of an adhesive agent. Thus, with the present embodiment, the number of parts can be reduced in comparison to a case where a separate weight member is adhered by an adhesive agent onto the piezoelectric element 42.

Also with the present embodiment, because the adhesive agent that is to be the weight member 58 is simply filled in a gap between the end face 42B of the piezoelectric element 42 and the mounting bracket 48, the ease of assembly of the actuator 34 can be improved. Furthermore, with the present embodiment, by filling a large amount of the adhesive agent between the end face 42B of the piezoelectric element 42 and the mounting bracket 48, the piezoelectric element 42 and the mounting bracket 48 can be firmly adhered.

Also with the present embodiment, because the weight member 58 is formed from the adhesive agent, it can be freely shaped, and the weight member 58 can be formed in accordance with the available space to make the device compact.

Though with the above-described embodiment, the piezoelectric element 42 is affixed to the mounting bracket 48 via the weight member 58, the piezoelectric element 42 may be affixed to the fixed frame 40 via the weight member 58 instead.

Also, though the above-described embodiment is an example in which the actuator is supported at the end face 42B of the piezoelectric element 42, the actuator supporting position is not limited thereto, and the actuator may be supported at the end face 42A or side faces of the piezoelectric element 42 or by side faces or a front end face of the driving shaft 44. In this case, the mounting bracket 48 is unnecessary, and the weight member 58 formed of the adhesive agent may be simply coated onto the end face 42B of the piezoelectric element 42 and hardened to an arbitrary shape.

Also, as applications of the actuator according to the present invention, application, for example, to digital cameras, mobile phones, and other compact precision apparatuses is possible. Especially with a mobile phone, driving must be performed at a low voltage of no more than 3V, and by using the actuator according to the present invention, driving at a high frequency of approximately 20 kHz is enabled and the holding frame 20 can be moved at a high speed of no less than 2 mm/s. Thus even a zoom lens requiring movement of approximately 10 mm can be rapidly moved. Applications of the actuator according to the present invention are not restricted to applications of moving focusing lenses, zoom lenses, and other movable lenses, and use in applications in which a CCD is moved is also possible.

Though with the present invention, the weight member 58 after drying may be a hard material, the use of a soft material is preferable from the following points. That is, by using a soft weight member 58, the resonance frequency of the system arranged from the piezoelectric element 42, the driving frictional member 44, and the weight member 58 is made low. By the resonance frequency being made low, effects due to scattering of the arrangement of the piezoelectric element 42, the driving shaft 44, and the weight member 58 are lessened, and a stable driving force can be obtained. Also, by the resonance frequency $f_0$ being made low, the driving frequency f can be readily set in a vibration-proof region of $f \geq 2^{1/2} \cdot f_0$ to lessen the effects of resonant vibration and enable a stable driving force to be obtained. Because the driving force due to extension and contraction of the piezoelectric element 42 is thereby reliably transmitted to the driven member, the driven member can be accurately moved in the extension/contraction direction of the piezoelectric element 42. Also, because the effects due to resonant vibration are lessened by the resonance frequency $f_0$ being made low, the supporting position and supporting method of the actuator can be arbitrarily selected, and for example, the actuator can be supported at the end face 42A or a side face of the piezoelectric element 42 or a side face or an end face of the driving shaft 44.

With the actuator according to the present invention, because the weight member that is attached to the other side of the electro-mechanical conversion element is formed of an adhesive agent, a separate weight member does not have to be provided and the number of parts can be reduced. Also, because the weight member that is formed of the adhesive agent can be freely shaped during manufacture, a weight member of a shape in accordance with the available space can be used.

The entire disclosure of each and every foreign patent application from which the benefit of foreign priority has been claimed in the present application is incorporated herein by reference, as if fully set forth.

What is claimed is:

1. An actuator comprising:
   an electro-mechanical conversion element;
   a driving frictional member mounted onto one side in an extension/contraction direction of the electro-mechanical conversion element;
   a driven member frictionally engaged with the driving frictional member;
   a weight member that comprises an adhesive agent and is attached to the other side in the extension/contraction direction of the electro-mechanical conversion element;
   an elastic supporting member that displaceably supports the other side of the electro-mechanical conversion element,
   wherein the weight member fixes, by adhesion, the other side of the electro-mechanical conversion element to the elastic supporting member.

2. The actuator according to claim 1, wherein a metal powder is kneaded into the adhesive agent.

3. The actuator according to claim 1, wherein a holding frame of a zoom lens is mounted onto the driven member.

* * * * *